US011978429B2

(12) United States Patent
Liu et al.

(10) Patent No.: US 11,978,429 B2
(45) **Date of Patent: *May 7, 2024**

(54) ACTIVE NOISE CANCELLING EARBUD DEVICES

(71) Applicant: Google LLC, Mountain View, CA (US)

(72) Inventors: Wensen Liu, Irvine, CA (US); Govind Kannan, Irvine, CA (US); Jayvon Timmons, Irvine, CA (US); Trausti Thormundsson, Irvine, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,249

(22) Filed: Mar. 31, 2023

(65) Prior Publication Data

US 2023/0317049 A1 Oct. 5, 2023

Related U.S. Application Data

(63) Continuation of application No. 17/063,656, filed on Oct. 5, 2020, now Pat. No. 11,626,097.

(60) Provisional application No. 62/911,150, filed on Oct. 4, 2019.

(51) Int. Cl.

| | |
|---|---|
| ***G10K 11/178*** | (2006.01) |
| ***G10H 1/00*** | (2006.01) |

(52) U.S. Cl.

CPC ....... *G10K 11/1785* (2018.01); *G10H 1/0066* (2013.01); *G10K 2210/1053* (2013.01); *G10K 2210/1081* (2013.01); *G10K 2210/505* (2013.01)

(58) Field of Classification Search

CPC ....... G10K 11/1785; G10K 2210/1053; G10K 2210/1081; G10K 2210/505

See application file for complete search history.

(56) References Cited

U.S. PATENT DOCUMENTS

| | | | |
|---|---|---|---|
| 8,611,553 | B2 | 12/2013 | Bakalos |
| 2008/0112569 | A1 | 5/2008 | Asada |
| 2009/0080670 | A1 | 3/2009 | Solbeck |

*Primary Examiner* — David L Ton

(74) *Attorney, Agent, or Firm* — Kilpatrick Townsend & Stockton LLP

(57) ABSTRACT

Systems and methods for audio listening devices, comprise a speaker coupled to a first housing, a sound port having a first end and a second end, wherein the first end is coupled to the first housing, and the second end is configured to be inserted in an ear canal of a person such that sound waves emitted from the speaker propagates via a secondary path to the ear canal through the sound port, active noise cancellation (ANC) components configured to generate anti-noise signals through the micro-speakers to cancel external noise, and a first microphone disposed within the sound port at the second end of the sound port such that the first microphone is configured to detect the anti-noise signal that propagates through the sound port via the secondary path and the external noise that propagates via a primary path.

20 Claims, 15 Drawing Sheets

ACTIVE NOISE CANCELLING EARBUD DEVICES

CROSS-REFERENCES TO RELATED APPLICATIONS

This application is a continuation of U.S. Non-Provisional application Ser. No. 17/063,656, filed Oct. 5, 2020, which claims the benefit of and priority to U.S. Provisional Application No. 62/911,150, filed Oct. 4, 2019, which is incorporated by reference as if set forth herein in its entirety.

TECHNICAL FIELD

The present disclosure generally relates to personal audio listening devices, and in various embodiments, for example, to active noise cancelling earbud devices.

BACKGROUND

Audio listening devices can come in various forms, such as earbuds, earphones, or headphones. Many audio listening devices include active noise cancellation (ANC) features built in to improve the user's listening experience by reducing or eliminating (e.g., cancelling) external noises. For example, if a user is listening to music through an audio listening device, external noises (e.g., from cars in the street) may be bothersome. Thus, the ANC features of the audio listening device will attempt to cancel the external noise so that the user can more clearly hear the music.

The performance of an ANC system can depend on various factors, including the form factor of the listening device, the relative position of one or more microphones and speakers of the listening device with respect to the user's ear canal and/or ear drum, the fit of the listening device to the user's ear or head, and/or other factors. Earbuds, for example, are designed to fit in the outer concha of the ear in close proximity to, adjacent to and/or inside of a person's ear canal, and present different ANC design challenges compared to other personal listening devices. The size, shape and cost of earbuds may dictate the available configurations and the ANC performance. In view of the foregoing, there is a continued need in the art for improved ANC functionality in earbud devices.

SUMMARY

The present disclosure is directed to various techniques for improving active noise cancelation performance in an audio listening device, such an earbud. In various embodiments, systems and methods for audio listening devices, comprise a speaker coupled to a first housing, a sound port having a first end and a second end, wherein the first end is coupled to the first housing, and the second end is configured to be inserted in an ear canal of a person such that sound waves emitted from the speaker propagates via a secondary path to the ear canal through the sound port, active noise cancellation (ANC) components configured to generate anti-noise signals through the micro-speakers to cancel external noise, and a first microphone disposed within the sound port at the second end of the sound port such that the first microphone is configured to detect the anti-noise signal that propagates through the sound port via the secondary path and the external noise that propagates via a primary path.

The scope of the present disclosure is defined by the claims, which are incorporated into this section by reference. A more complete understanding of embodiments of the disclosure will be afforded to those skilled in the art, as well as a realization of additional advantages thereof, by a consideration of the following detailed description of one or more embodiments. Reference will be made to the appended sheets of drawings that will first be described briefly.

Figure 2:
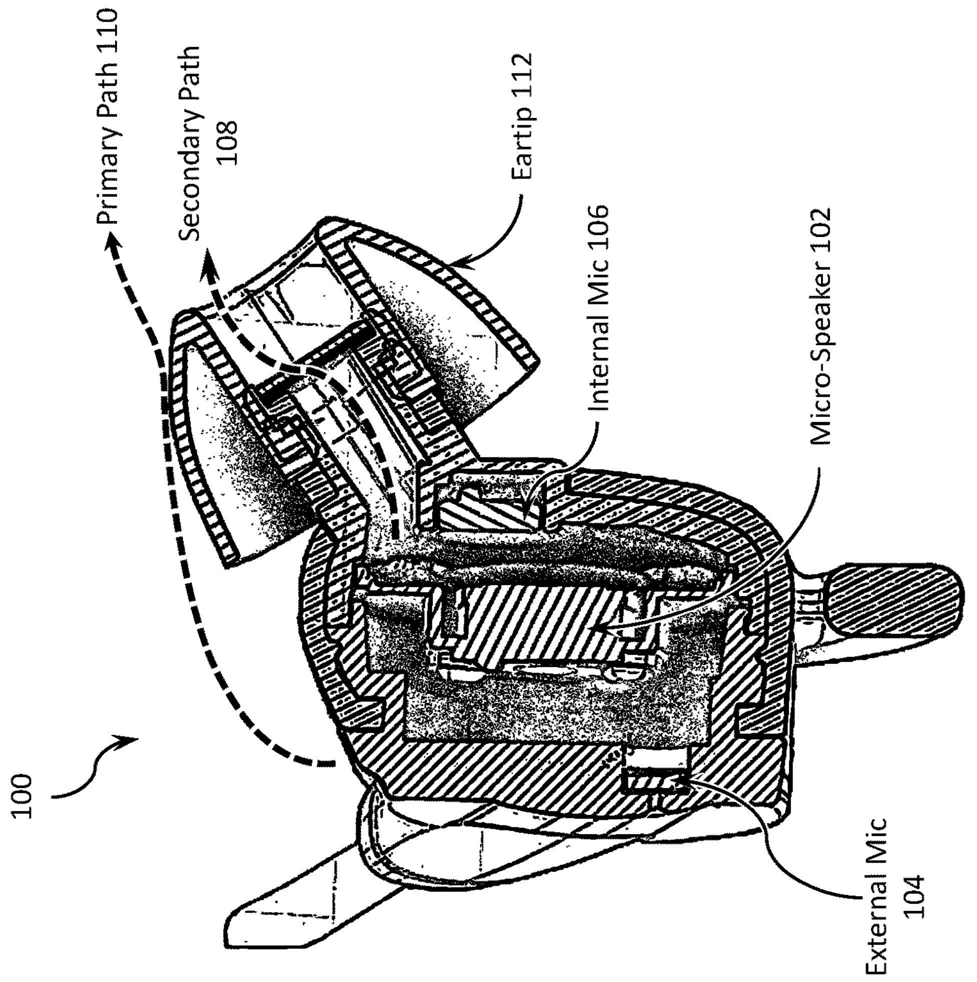
FIG. 2 (Prior Art)
FIG. 2 illustrates a cross-sectional view of the ANC earbud of FIG. 1.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

The present disclosure provides improves systems and methods for active noise cancellation (ANC) processing in an earbud listening device, or similar personal audio listening device.

Figure 1:
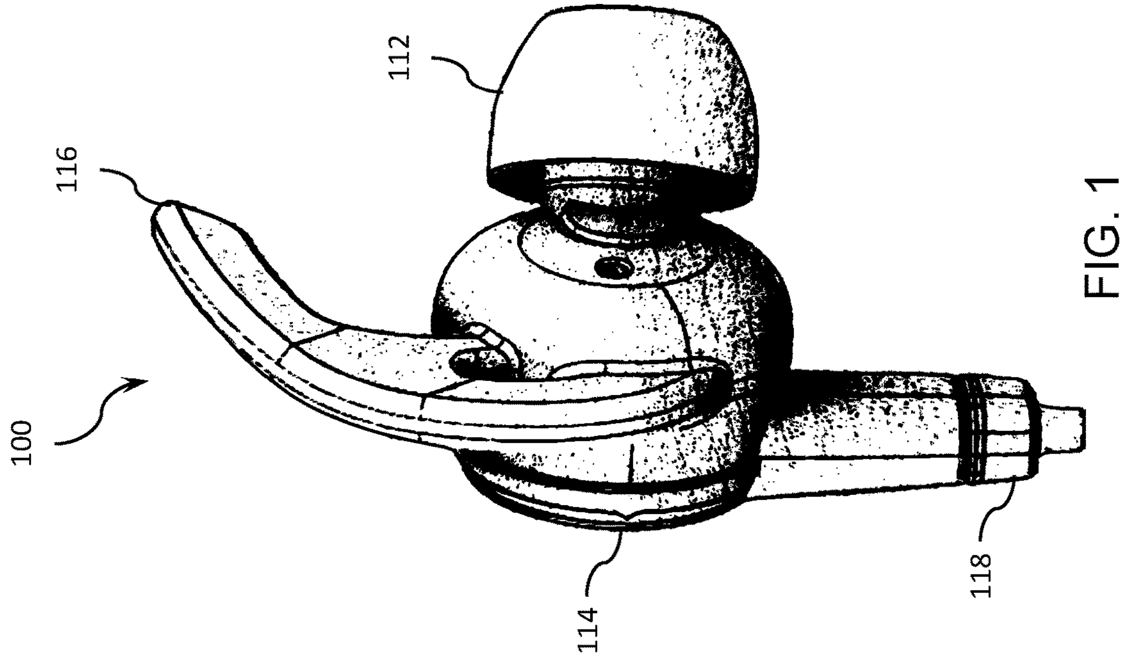
FIG. 1 (Prior Art)
FIG. 1 illustrates an example conventional Active Noise Cancelling (ANC) earbud.
Figure 3:
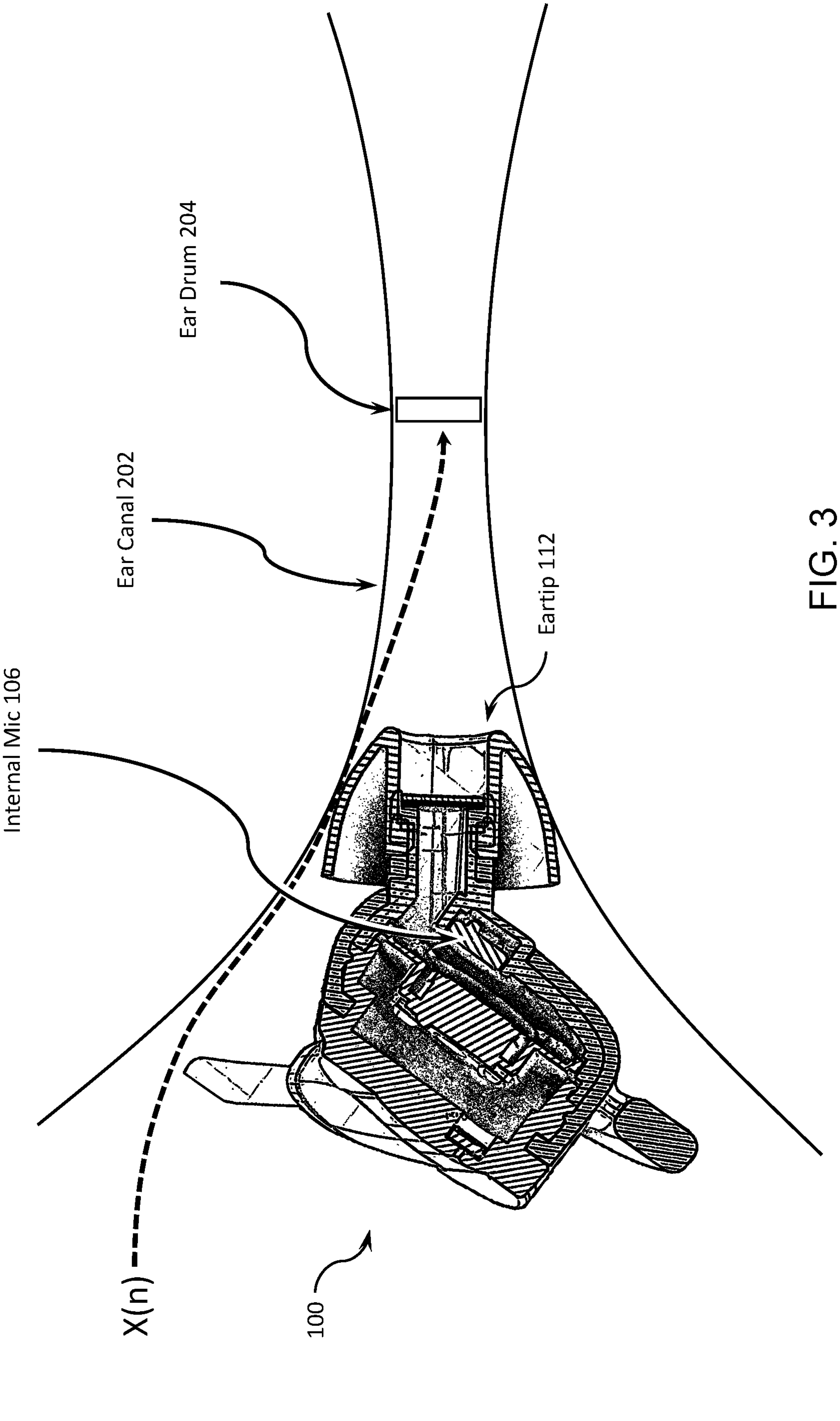
FIG. 3 (Prior Art)
FIG. 3 illustrates the example earbud of FIGS. 1-2, fitted inside a person's ear.

Referring to FIGS. 1-3, a conventional earbud configured for ANC will first be described. An earbud 100 includes a housing 114 configured to house electronic components for processing one or more audio signals for playback through one or more speakers, such as micro-speaker 102. In operation, external sounds from a primary path 110 may reach a user's ear drum and interfere with the user's listening experience. ANC processing components are configured to sense external noise at a reference sensor, such as an external microphone 104 which generates an external noise signal. The external noise also passes through a noise path (e.g., a primary path 110) to the user's eardrum, which may include the housing 114 and components of the earbud 100. In various embodiments, the earbud 100 includes an internal microphone 106, which may function as an error microphone. As used herein, the primary path 110 may be represented a transfer function modeling the acoustic path between the external microphone 104 and the internal microphone 106.

In various embodiments, the ANC system may include a feedforward path configured to generate an anti-noise signal from the received external noise signal x(n), received via the external microphone 104. The ANC path may include a feedforward adaptive filter and other processing components configured to adaptively estimate the primary path 110 (P(z)) to produce an anti-noise 105 signal ( );(n)) from the micro-speaker 102 for cancelling the external noise signal. The ANC system may include a feedback path configured to adapt an anti-noise signal to reduce an error sensed at the internal microphone 106.

An earbud 100 with ANC functionality usually includes a speaker, such as an integrated micro-speaker 102, an external microphone 104, and an internal microphone 106 in each of the left and right earbuds. In various embodiments, the earbud 100 may further include a wing 116 configured to fit in the user's ear to secure the earbud 100 in place when in use, and a communications port 118, which may include wireless and/or wireless communications components, configured to communicate audio signals, control signals and other data between the earbud 100 and a host device. When a user places one of the earbuds 100 inside the ear as shown in FIG. 3, the user hears desired audio (e.g., voice and/or music) being played back through the micro-speaker 102. At the same time, if there is environmental noise, the user may hear the noise as it propagates around the earbud and into the ear shown as primary path 110. The user hears the external noise because although the ear tip 112 substantially seals the earbud 100 just inside of the ear canal 202, it does not form a perfect acoustically insulated seal and any external noise, especially in the lower frequency ranges (e.g., <1 kHz), can still propagate into the human ear and be heard at the ear drum 204 through the primary path 110.

The ANC processing system substantially reduces and/or cancels the external noise by generating anti-noise. The external microphone 104 (also known as a primary microphone, a reference microphone, or a feedforward microphone) may be employed to sense the external noise and apply signal processing to generate the anti-noise signal by the micro-speaker 102. The generated anti-noise signal is propagated in the secondary path 108 where it is combined with the external noise to cancel each other out. Thus, an ideal anti-noise signal has the same amplitude as the background noise and is 180-degrees out-of-phase.

The internal microphone 106 (also known as an error microphone or a feedback microphone) may be positioned to sense and sum the external noise from the primary path and the anti-noise from the secondary path to determine an error signal corresponding to how much of the external noise was successfully cancelled by the anti-noise. The error signal may be processed (e.g., feedback) to further cancel any residual noises that are not initially cancelled by feedforward ANC scheme. An ideal noise cancellation is achieved when the noise signal from the primary path and the anti-noise signal from the secondary path have the same amplitude but is 180-degrees out-of-phase. However, achieving ideal noise cancellation is difficult. Thus, further signal processing may be applied based on the error signal to update the anti-noise signal to further improve the noise cancellation to achieve a more ideal noise cancellation by continuing to process the error signal until the error signal is zero or substantially non-existent.

ANC may be performed by a feedforward ANC system, a feedback ANC system, or a combination of the feedforward and feedback in a hybrid ANC system. Moreover, ANC may be performed digitally and/or in analog. Thus, if analog microphones are used in a digital ANC system, then the analog signals are converted to a digital signal through an analog-to-digital converter (ADC), and then reconverted back to analog with a digital-to-analog converter (DAC) before being sent to the analog micro-speaker.

Figure 4:
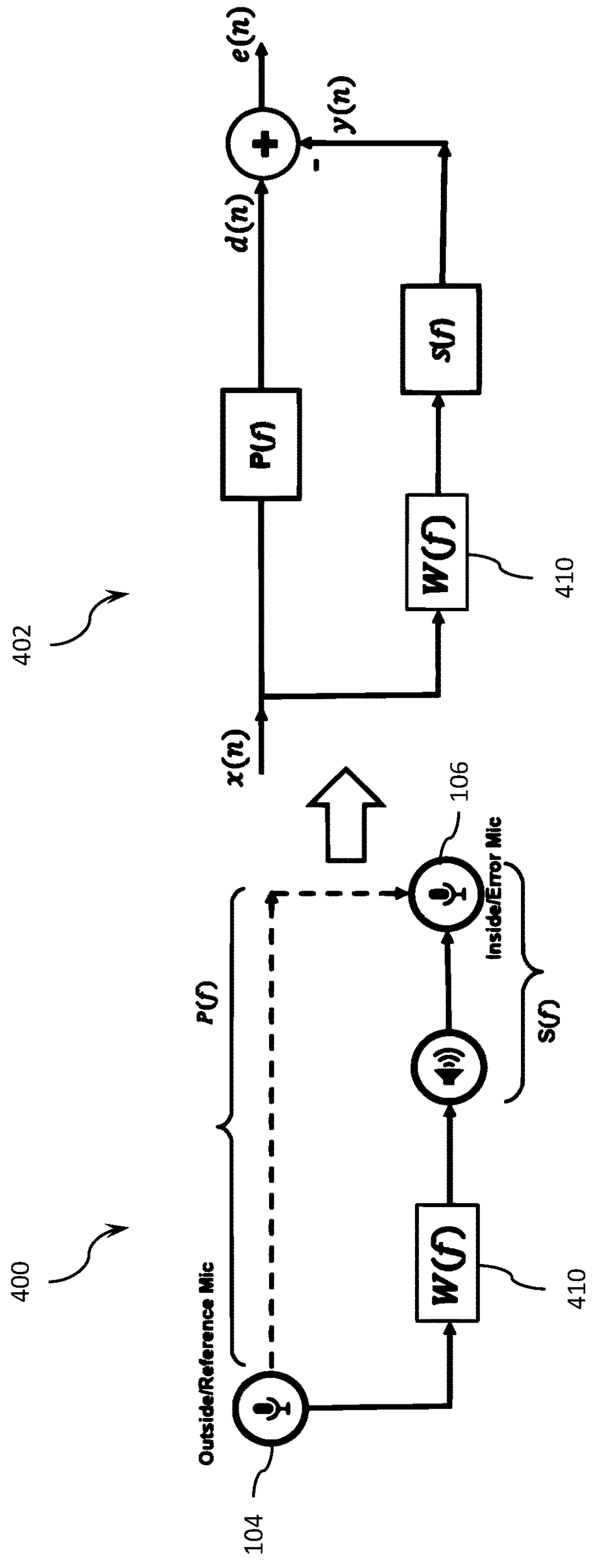
FIG. 4 illustrates an example of a feedforward ANC system block diagram, according to various embodiments of the present disclosure.

Referring to FIG. 4, an example feedforward ANC system block diagram 400 and signal flow diagram 402 will now be described. The external microphone 104 senses external noise x(n) that propagates through the primary path P(f) and is also used as an input to an ANC filter 410 (W(f)) to generate a secondary signal to drive the micro-speaker S(f). The internal microphone 106 is used to sum the signals from both the primary path 110 and the secondary path 108. Mathematically, they are represented in the frequency domain as follows:

$$\text{Disturbance from primary path } d=P(f)x \tag{1}$$

$$\text{Anti-noise from secondary path } y=W(f)S(f)x \tag{2}$$

$$\text{Error signal } e=d-y=[P(f)-W(f)S(f)]x \tag{3}$$

$$FF\ ANC \text{ performance } e/d=[P(f)-W(f)S(f)]/P(f) \tag{4}$$

$$\text{Maximum achievable performance } W(f)=P(f)/S(f) \tag{6}$$

Based on the equations, error signal e(n)=0, when ANC filter W(f) is satisfied according to Equation (5), which means that there is no residual noise at the internal microphone location where this is sensed, thus achieving maximum noise cancelling. However, such ANC filter W(f) may be difficult to realize in practice for several reasons. Acoustically, the external noise x(n) leaks around the earbud 100 through the area where the ear tip 112 makes contact with the ear canal 202, and the noise is directed toward the ear drum 204 through the ear canal 202. At the same time, the external noise is diffracted back through the ear tip 112 of the earbud 100 to reach the internal microphone 106.

The internal microphone 106 that senses the disturbance from primary path 110, as shown by Equation (1), is not the same as the noise travelling toward the ear canal (e.g., the noise that we intend to cancel out). Thus, an ANC filter W(f) that satisfies Equation (5) will lead to good noise cancellation at the location of the internal microphone 106, but it does not necessarily lead to good noise cancellation at the location of the eardrum, which is what the user will experience. This discrepancy may be overcome by positioning the internal microphone 106 closer to the ear drum. For example, if the error microphone is positioned outside of the ear tip 112 closer to the ear drum, the error microphone may be able to sense a disturbance d(n) that is the same (or substantially the same) as the noise travelling toward the ear canal. In this manner, the user may be able to experience a better noise cancellation.

Figure 5:
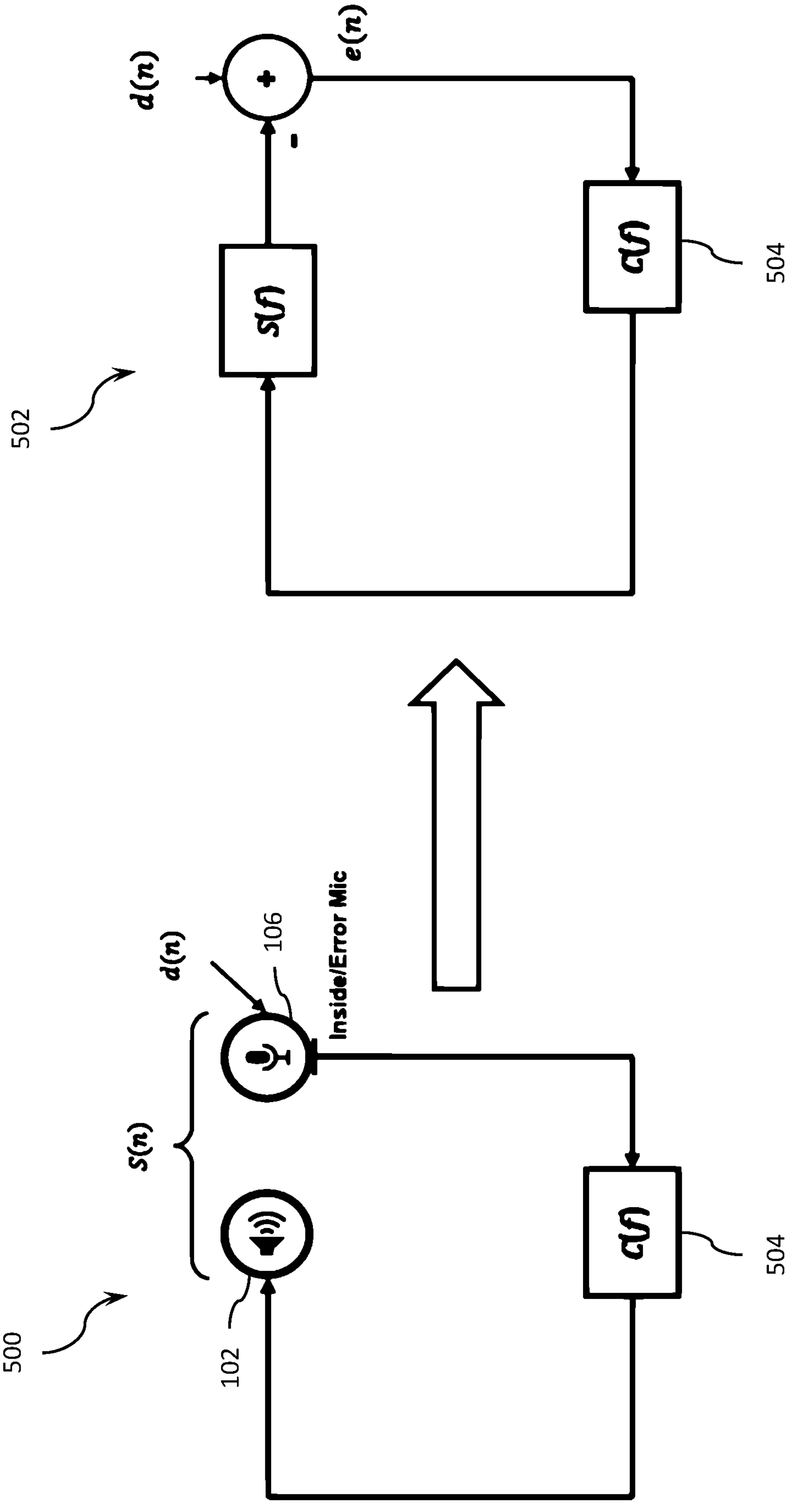
FIG. 5 illustrates an example of a feedback ANC system block diagram, according to various embodiments of the present disclosure.

Referring to FIG. 5, an example feedback ANC system block diagram 500 and signal flow diagram 502 will now be described in accordance with various embodiments. A residual error signal e(n) received (e.g., captured) by the internal microphone 106 is provided as an input to an ANC filter 504 (C(f)) to generate a secondary signal to drive the micro-speaker 102 (S(f)). The internal microphone 106 is then used to sum up the analog signals from both the primary path 110 and the secondary path 108. Mathematically, they are represented in the frequency domain as follows:

$$\text{Disturbance from primary path } d=P(f)x \tag{6}$$

$$\text{Anti-noise from secondary path } y=C(f)S(f)e \tag{7}$$

$$\text{Error signal } e=d-y=P(f)x-C(f)S(f)e \tag{8}$$

$$FB\ ANC \text{ performance } e/d=1/[1+C(f)S(f)] \tag{9}$$

For similar reasons as in the feedforward ANC system, the feedback ANC system may lead to good noise cancellation at the location of the internal microphone 106, but it does not necessarily lead to good noise cancellation at the location of the eardrum, which is what the user will experience.

Figure 6:
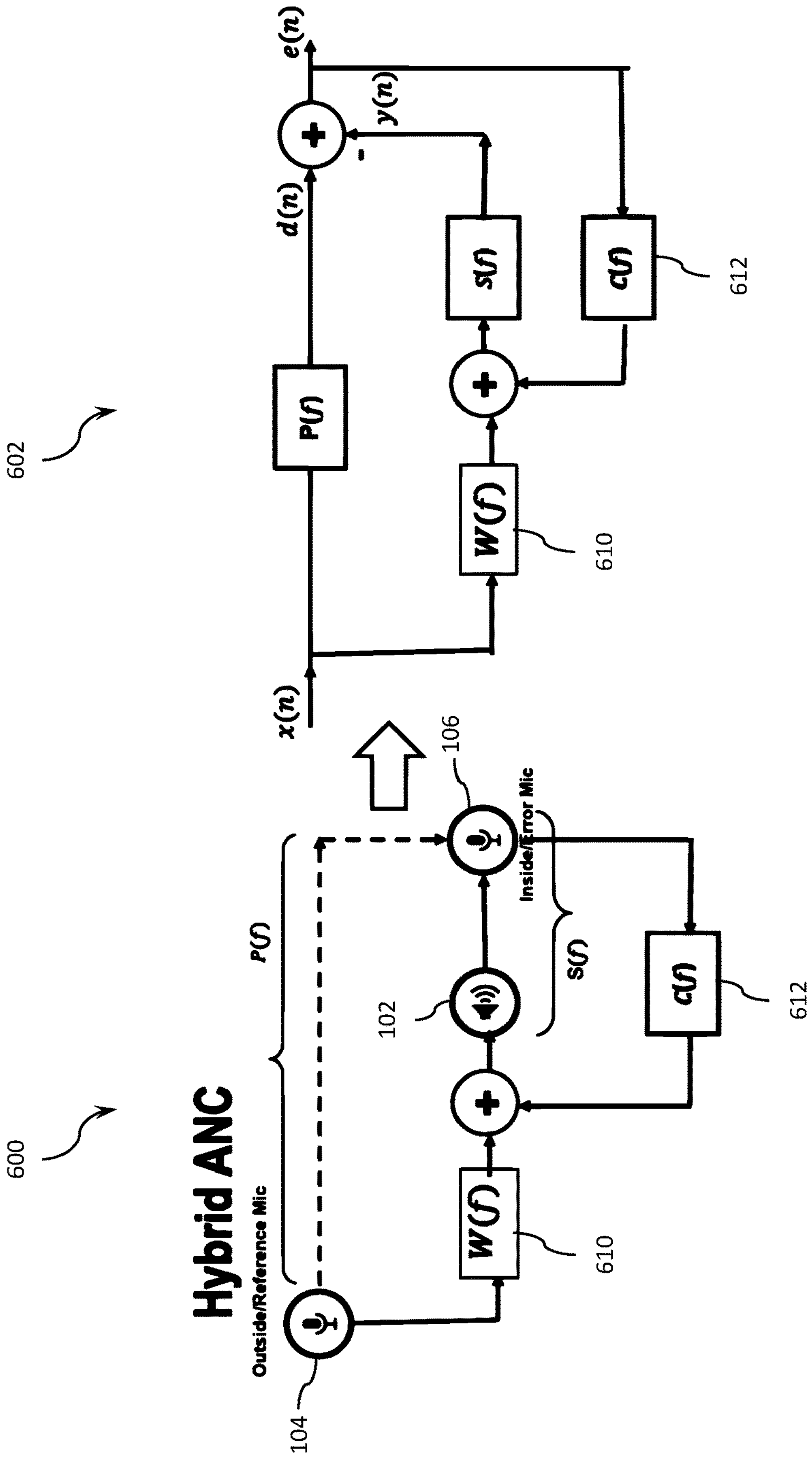
FIG. 6 illustrates an example of a hybrid feedforward-feedback ANC system block diagram, according to various embodiments of the present disclosure.

Referring to FIG. 6, an example hybrid ANC system 600 and signal processing diagram 602, are illustrated combining the feedforward ANC and the feedback ANC systems to further improve the quality of the background noise cancellation. The residual noise received by the internal microphone 106 from the feedforward ANC processing is further processed with the feedback ANC. Thus:

$$\text{Hybrid } ANC \text{ performance } e/d=[P(f)-W(f)S(f)]/\{P(f)[1+C(f)S(f)]\} \tag{10}$$

For similar reasons as previously discussed regarding the feedforward and the feedback ANC systems, the hybrid ANC system 600 may also lead to good noise cancellation at the location of the internal microphone 106, but it may not lead to good noise cancellation at the location of the eardrum, which is what the user will experience.

In various embodiments, the hybrid ANC system 600 may include additional digital and/or analog components depending on the implementation (e.g., a digital signal processor, one or more analog-to-digital converters, etc.). For example, the ANC filter 610 may be a digital filter for processing digital signals. Yet, the external microphone 104 and the internal microphone 106 may be analog microphones. Thus, the signal received by the external microphone 104 is first digitized by an ADC and then sent to digital filter 610 (W(f)) to process the noise and generate the anti-noise signal y(n). The generated anti-noise signal is next processed by a DAC convertor before it is sent to and outputted by the micro-speaker 102. The signal received by the internal microphone 106 is first digitized by the ADC and then sent to digital filter 612 (C(f)) to process the noise and generate the anti-noise signal. The generated anti-noise signal is next processed by the DAC before it is sent to the micro-speaker 102.

Referring to the example hybrid ANC system illustrated in FIG. 6, the ANC filter may be a digital filter for processing digital signals. Yet, the external microphone 104 and the internal microphone 106 are usually analog microphones. Thus, the signal received by the external microphone is first digitized by the ADC and then sent to digital filter W(f) to process the noise, meanwhile, the signal received by the internal microphone 106 is first digitized by the ADC and then sent to digital filter C(f) to process the noise. The outputs from ANC filters W(f) and C(f) are summed in the secondary path to generate the anti-noise signal. The generated anti-noise signal is next processed by the DAC before it is sent to the micro-speaker 102.

ADCs and DACs generally have some built-in latency (e.g., the ADC and the DAC may have a combined latency of about 16 us). To achieve good noise cancellation, the noise from both the primary and secondary paths should be of same amplitude and 180 degrees out-of-phase. However, the introduction of latency may limit the noise cancelling bandwidth, particularly in the higher frequencies (e.g., 1-2 kHz), whereas the latency has a lesser impact for the lower frequencies (e.g., <1 kHz).

Figure 7:
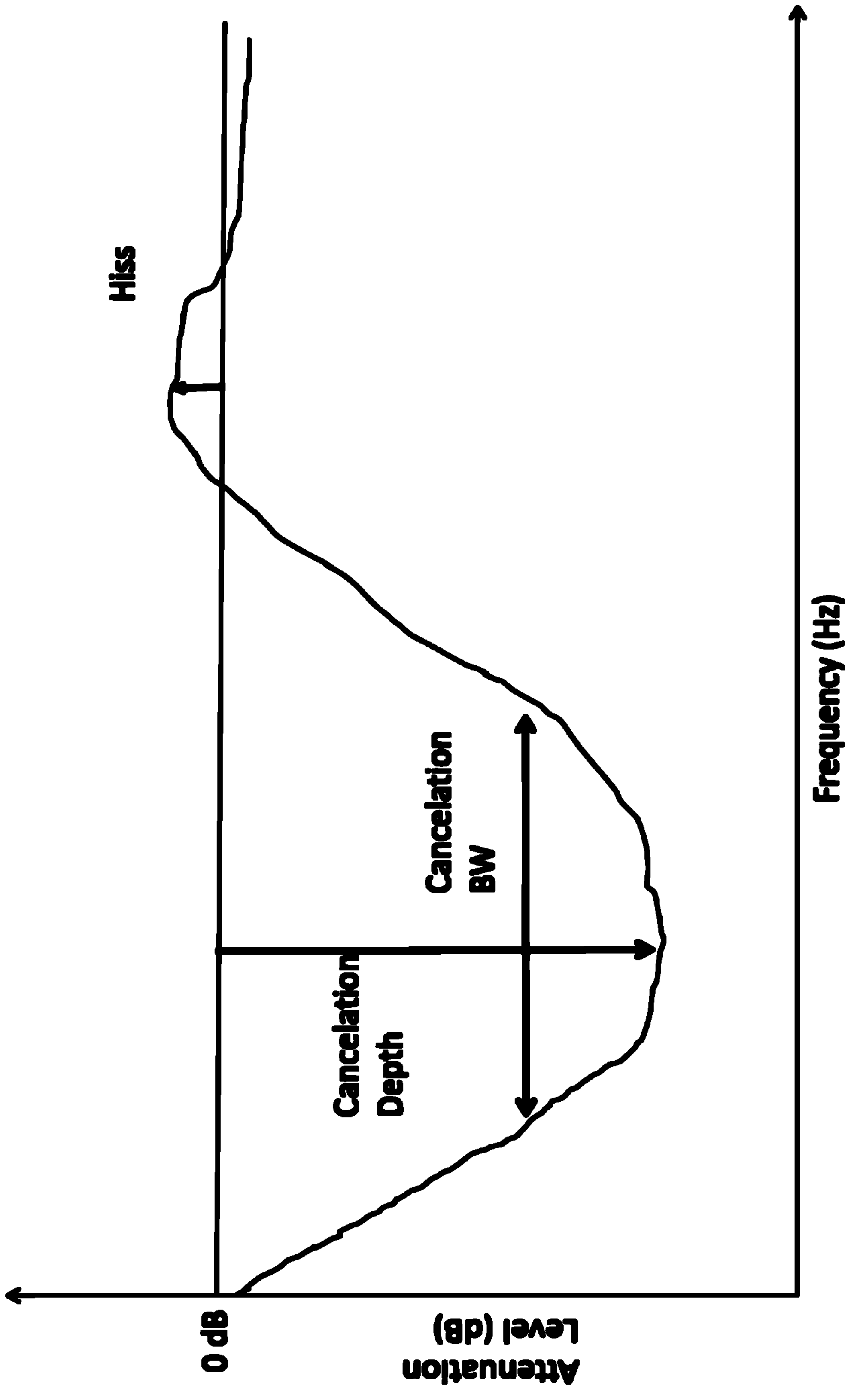
FIG. 7 is a graph representing noise cancellation across various frequencies according to a conventional design ANC earbud.

In some instances, higher frequency noises may even be amplified, thus producing a hissing sound instead of cancelling the noise as shown in FIG. 7. Consequently, depth and bandwidth limitations are present because it is difficult to measure the primary path 110 noise entering ear canal and the latency introduced in the secondary path 108. Moreover, good noise cancellation (e.g., good depth and good bandwidth) at the internal microphone 106 location does not necessarily lead to same noise cancellation qualities experienced at the eardrum location. Thus, an improved technique is desired to improve noise cancellation.

Figure 8:
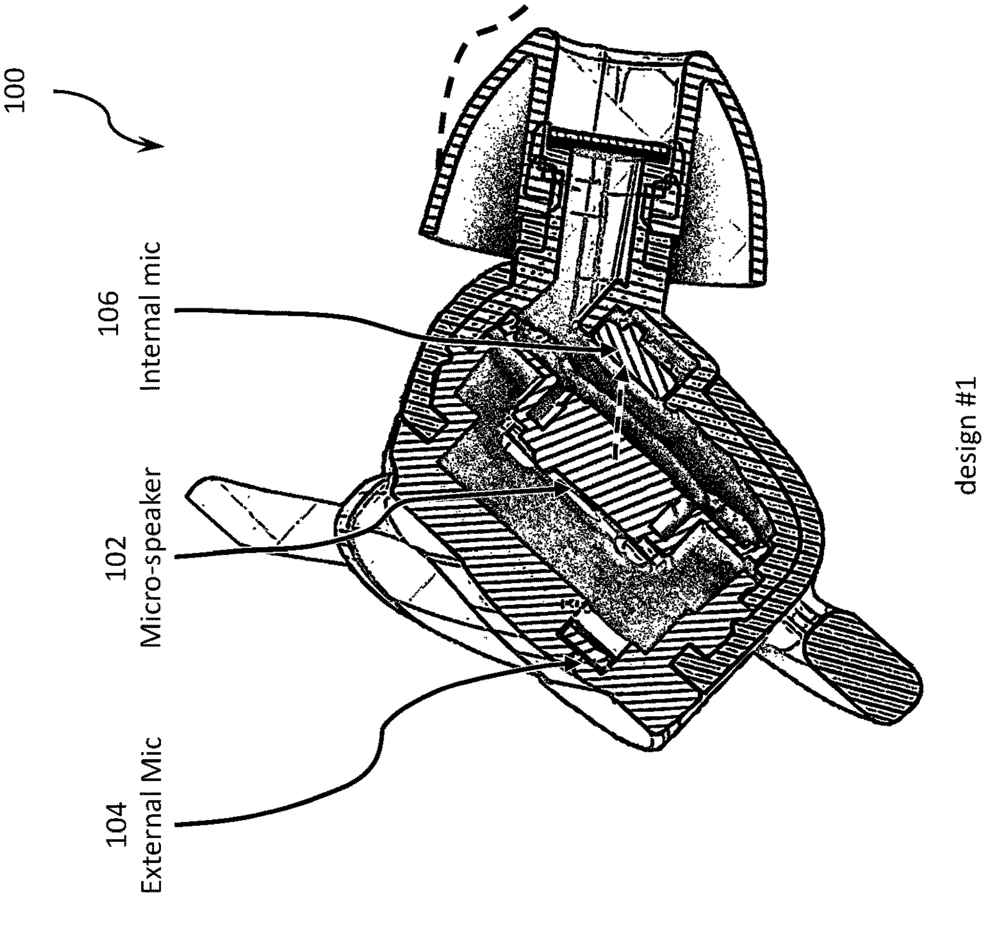
FIG. 8 illustrates a cross-sectional view of a conventional ANC earbud.

Referring to FIG. 8, further aspect of a conventional earbud 100 will now be described. In a conventional design, the internal microphone 106 is generally located close to the micro-speaker 102 because the convention is to measure the sound waves that propagate out from the micro-speaker 102. Thus, the internal microphone 106 is located far inside of the earbud sound chamber.

Figure 9:
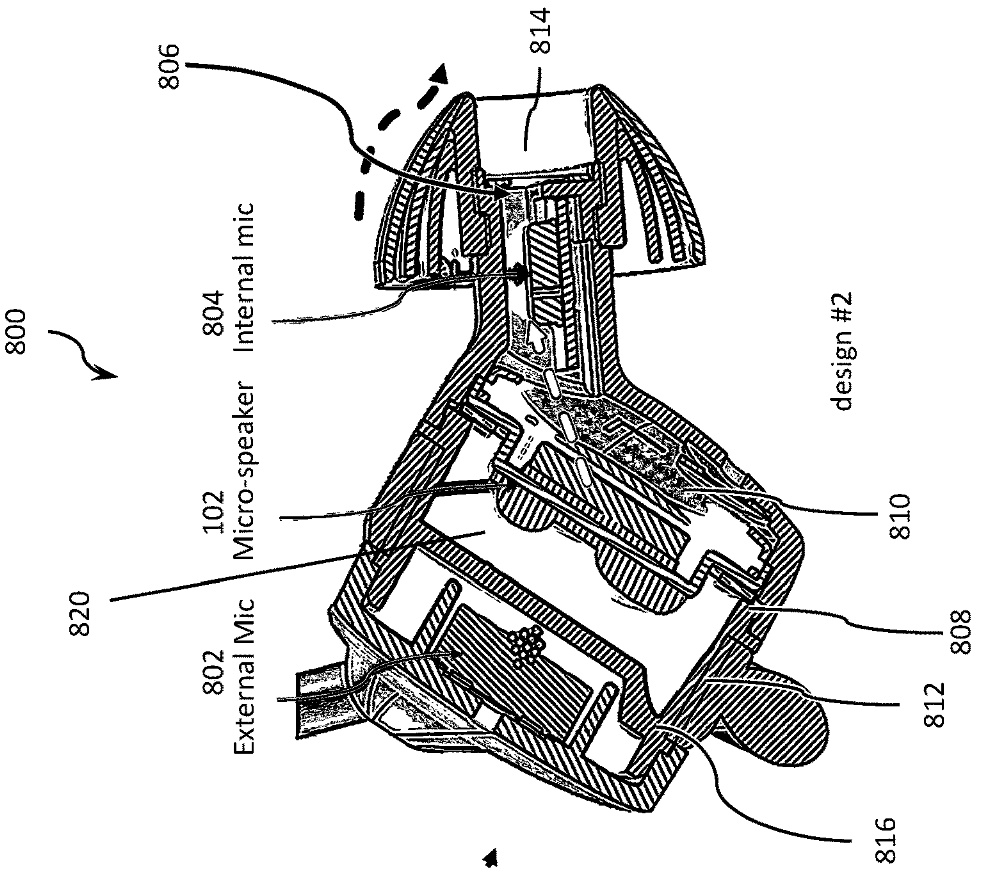
FIG. 9 illustrates a cross-sectional view of an improved ANC earbud, according to various embodiments of the present disclosure.

FIG. 9 illustrates an example improved ANC earbud 800 according to various embodiments of the present disclosure. According to the illustrated embodiment, the internal microphone 804 is disposed within the sound port 806 of the earbud 800 instead of being disposed closer to the micro-speaker 102 as in the conventional earbud 100 design.

More specifically, the earbud 800 includes a first housing 810, a second housing 812, and a third housing 816. The first housing 810 is formed with a mount 808 for mounting the micro-speaker 102, a sound chamber, and a sound port 806. The micro-speaker 102 emits the sound and the sound waves propagate towards an output 814 of the earbud. The second housing 812 may include an acoustic chamber 820 for the micro-speaker back-cavity. In some embodiments, the third housing 816 is coupled with the opposite side of the second housing 812 to house an external microphone 802. In some embodiments, the external microphone 802 can be directly integrated in the second housing 812.

In some embodiments, the sound chamber 810 includes a sound port 806. In this manner, the sound wave that is emitted by the micro-speaker 102 travel through the sound chamber 810, and then travels through the sound port 806, and out of the earbud 800 through the output 814. The sound port 806 may be a substantially cylindrical channel having an opening on either ends of the channel like a pipe. The internal microphone 804 may be disposed within the sound port 806 and as close as possible to the output 814 at an outer edge of the sound port 806. Accordingly, the placement of the internal microphone 804 is different from conventional designs where the microphone is positioned substantially closer and/or adjacent to the micro-speaker. By disposing the internal microphone 804 near the output 814 of the sound port 806, the internal microphone 804 is able to sense the primary noise path more closely corresponding to the noise that is entering the ear canal of the user. Moreover, the distance between the internal microphone 804 and the user's eardrum is closer than the distance found in a conventional earbud design. For this additional reason, the error signal e(n) determined by the internal microphone 804 according to this embodiment correlates more closely to the error that may be heard by the user's eardrum.

In some embodiments, by positioning the internal microphone 804 closer to the output 814, the distance between the external microphone 802 and the internal microphone 804 is increased. Thus, it takes a longer amount of time for the external noise to reach the location of the internal microphone 804 via the primary path. The longer time allows more time for the ANC circuitry and for the ANC filter W(f) to process the anti-noise signal therefore being more causal than the conventional design.

Figure 10:
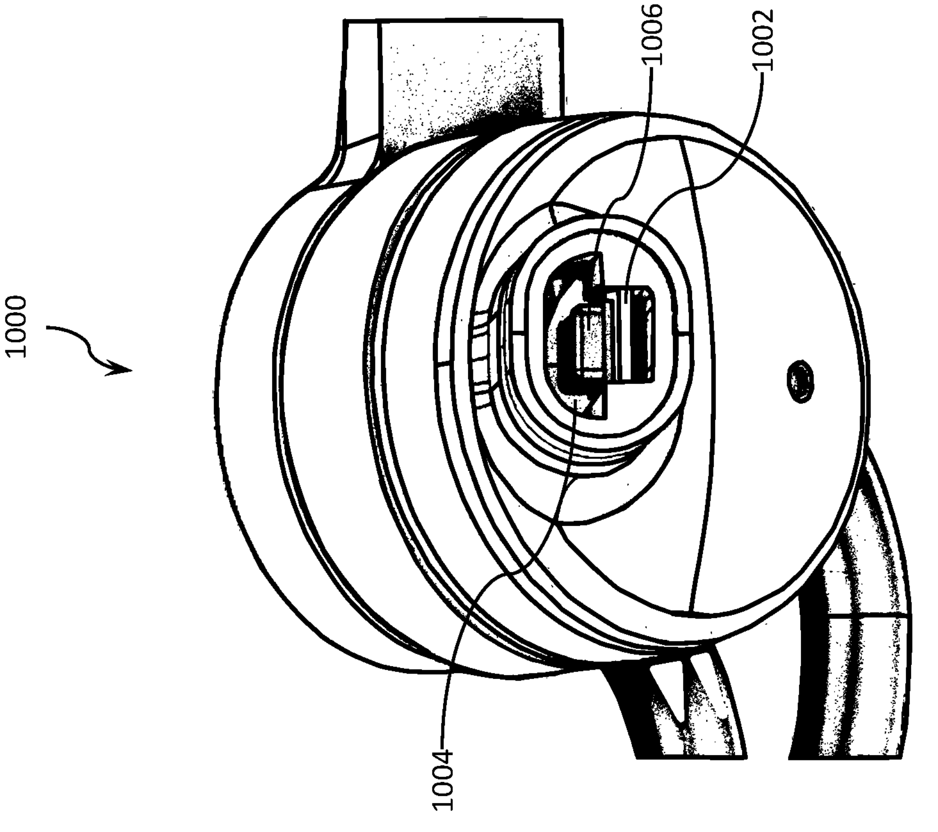
FIGS. 10-11 illustrate close-up views of a sound port of an earbud, according to various embodiments of the present disclosure.
Figure 11:
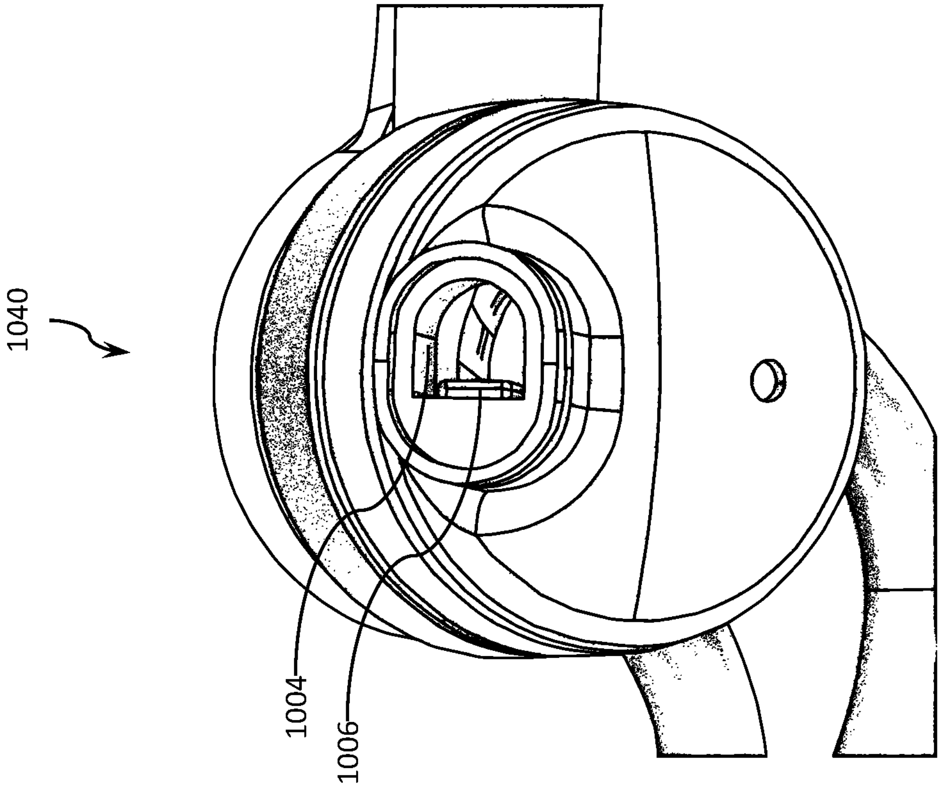

In some embodiments, the sound port 806 may have other structural features to mount or position the internal microphone 804 depending on factors such as the available inner diameter or space of the sound port 806, the physical size of the internal microphone 804, and the angle of the position of the internal microphone 804. For example, as illustrated in FIGS. 10-11, the outer circumference of a sound port 1000 or a sound port 1040 may be cylindrical but the inner portion of the sound port 1000 may have a D-shape sound port 1004 to facilitate mounting the internal microphone 1006 such that it is positioned in the path of the sound waves. Referring to FIG. 10, the D-shaped sound port 1004 may have a notch 1002 configured to recess the internal microphone 1006 to reduce the amount of area that the microphone occupies in the sound port 1004.

Figure 12:
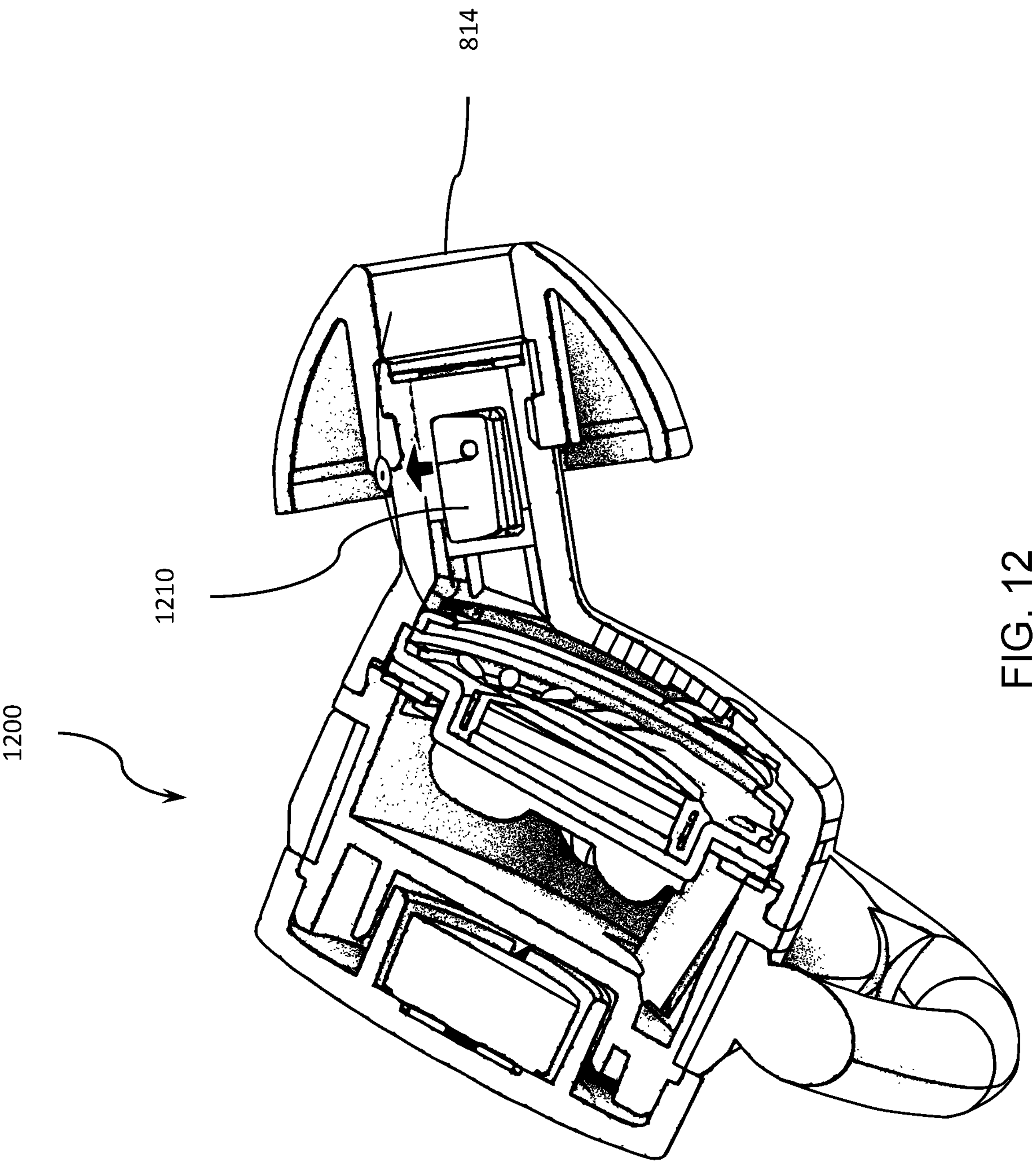
FIG. 12 illustrates a cross-sectional view of another example earbud, according to various embodiments of the present disclosure.

FIG. 12 illustrates a cross-sectional view of another example earbud 1200 according to an embodiment of the present disclosure. In this embodiment, the orientation of the internal microphone 1210 in the sound port 806 may be rotated, for example, 90 degrees, 180 degrees, 270 degrees, etc., for the microphone to be disposed closer to the output 814 (and thus closer to the ear drum of the listener) to better capture the sound wave propagation.

Figure 13:
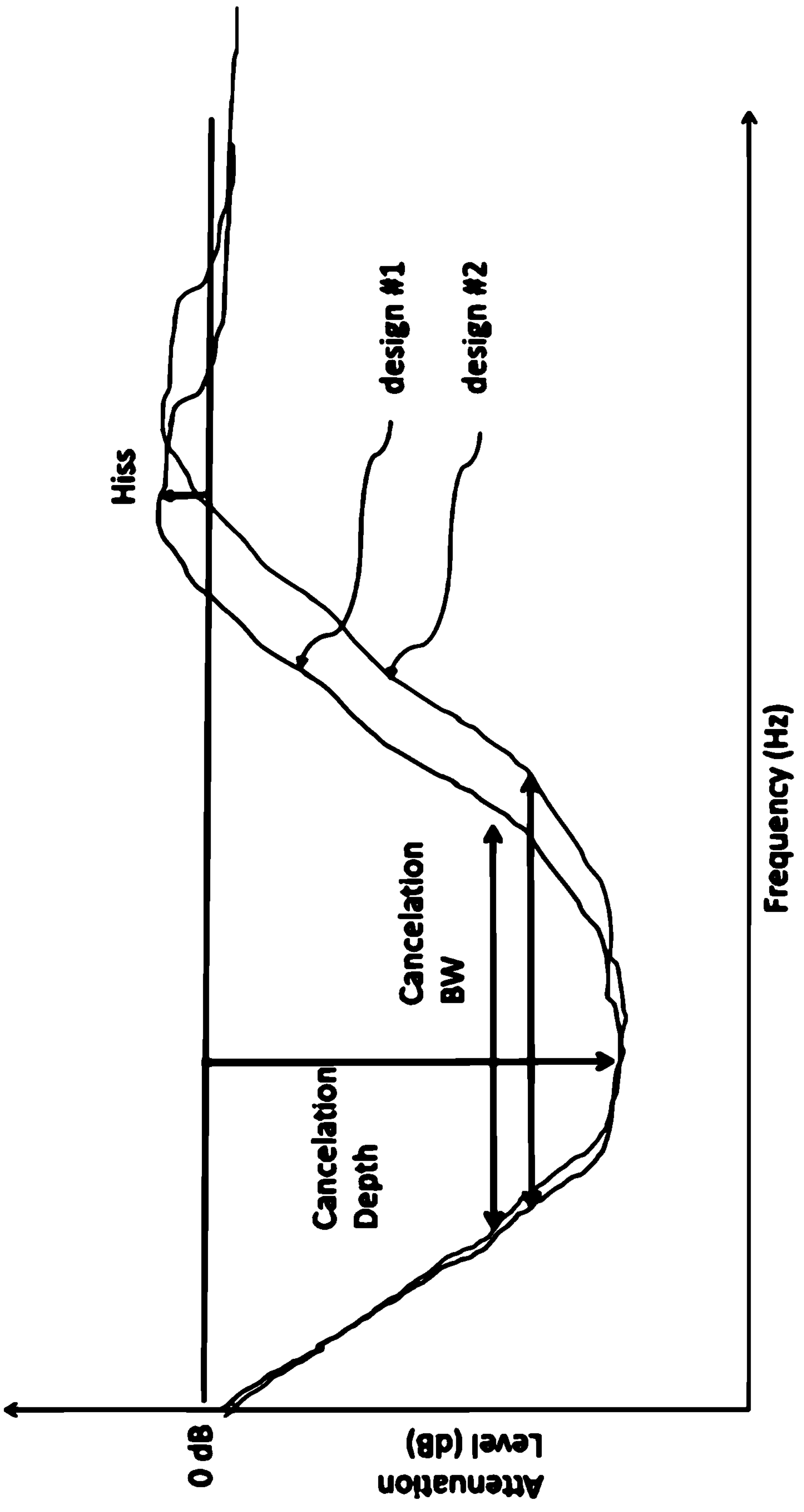
FIG. 13 is a graph representing noise cancellation across various frequencies according to a conventional design ANC earbud in comparison with an improved ANC earbud, according to various embodiments of the present disclosure.

Referring to FIG. 13, a graph representing noise cancellation across various frequencies according to a conventional design ANC earbud is compared to the improved ANC earbud according to various embodiments of the present disclosure. As shown, the improved design with the internal microphone closer to the output of the sound port, closer to the user's ear drum, further from the micro-speaker, provides for a deeper noise cancellation and across a wider range of frequencies, particularly in the higher frequencies.

Figure 14:
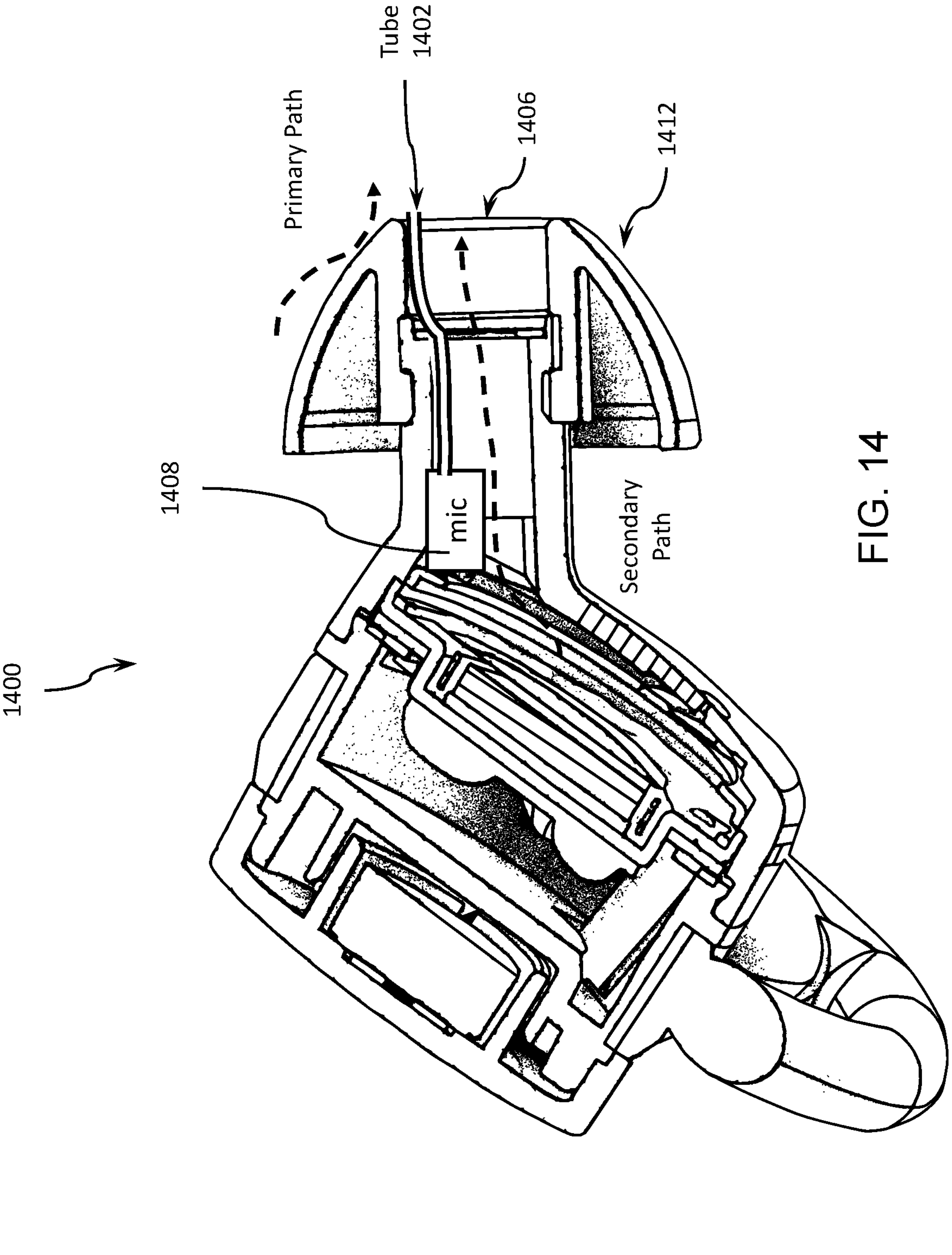
FIG. 14 illustrates another example embodiment of an earbud according to various embodiments of the present disclosure.

FIG. 14 illustrates another example embodiment of an earbud 1400 according to an embodiment of the present disclosure. The noise cancellation error detected may be further reduced by bringing an internal microphone port even closer toward the user's eardrum by using a tube 1402. In some embodiments, the tube 1402 may be a soft or a flexible tubing that is attached to the ear tip 1412 of the earbud 1400. As illustrated, the ear tip 1412 extends further outward from the sound port 1406 such that the ear tip 1412 snuggly fits inside of an ear canal of the user. Thus, the tube 1402 may be positioned closer to the user's eardrum as compared to a microphone that is further inside the earbud (e.g., inside the sound port or inside the sound chamber). In some embodiments, a microphone 1408 with the tube 1402 at the tip (e.g., at the output of 1406) may be configured to measure sound waves, and the microphone 1408 may be disposed at a location inside of the earbud where the design has more room to accommodate the microphone. The noise from the primary path and the anti-noise from the secondary path enters the sound port 1406 and is sensed by microphone 1408. In some embodiments, the tube 1402 may be positioned such that a portion of the tube extends beyond the ear tip 1412, further extending the tube 1402 into the user's ear canal. As such, the tube 1402 is positioned so as to capture the external noise from the primary path and the anti-noise from the secondary path close to the user's eardrum with the same tube transfer function, as compared to an internal microphone that is disposed further inside of the earbud.

Figure 15:
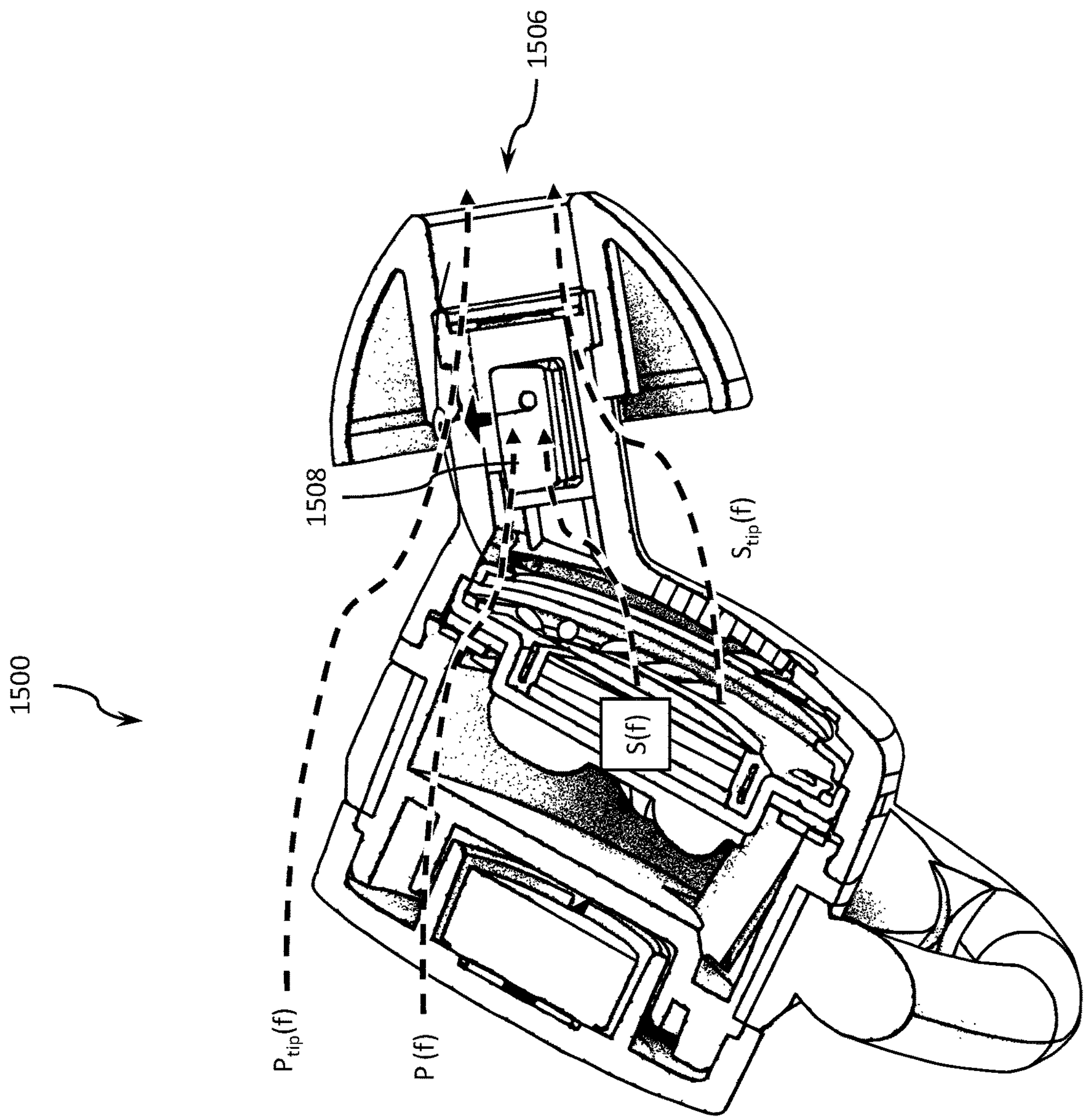
FIG. 15 illustrates another example embodiment of an earbud according to various embodiments of the present disclosure.
Figure 16:
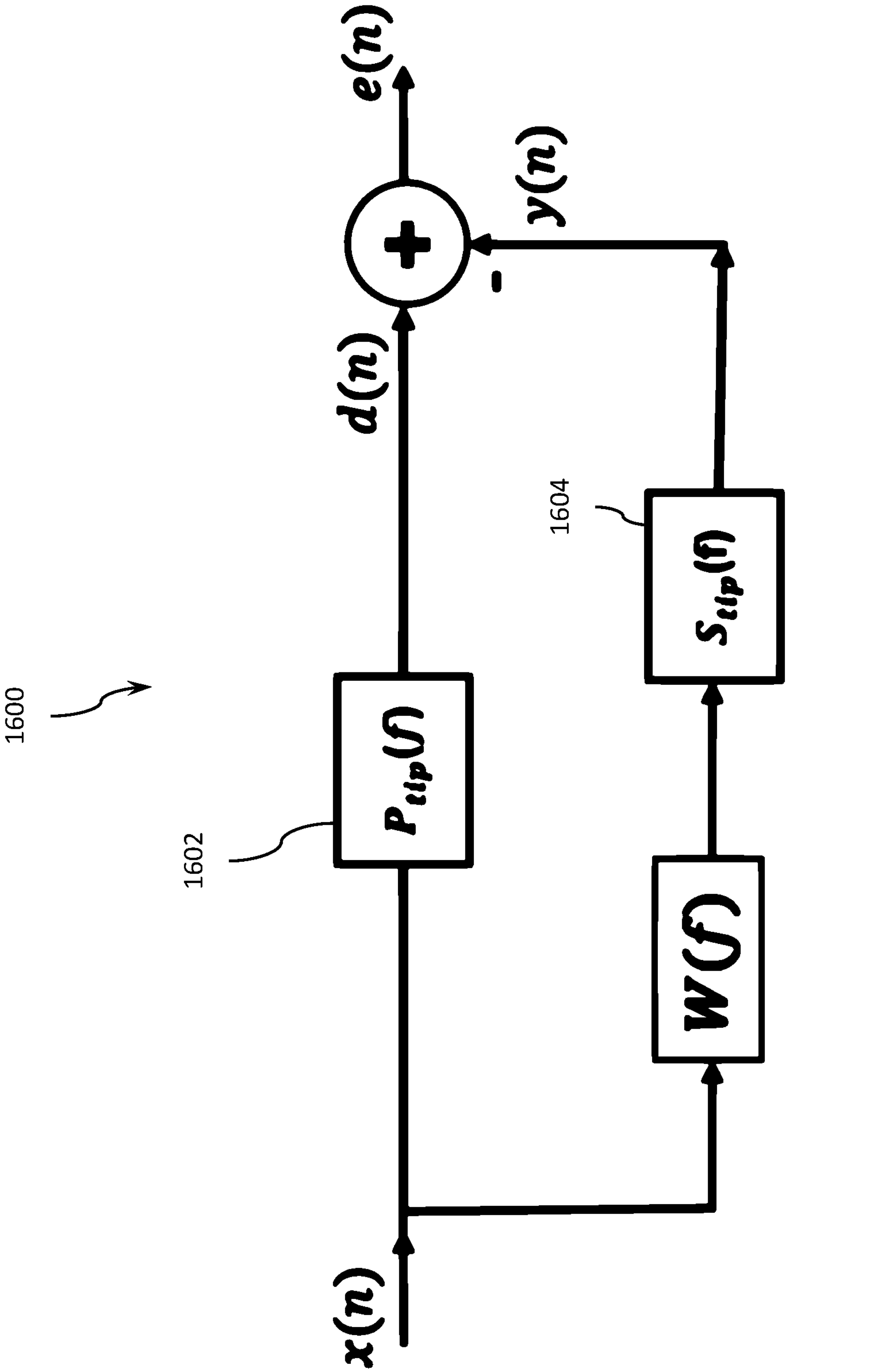
FIG. 16 is a block diagram of a virtual ANC signal processing technique, according to various embodiments of the present disclosure.
Figure 17:
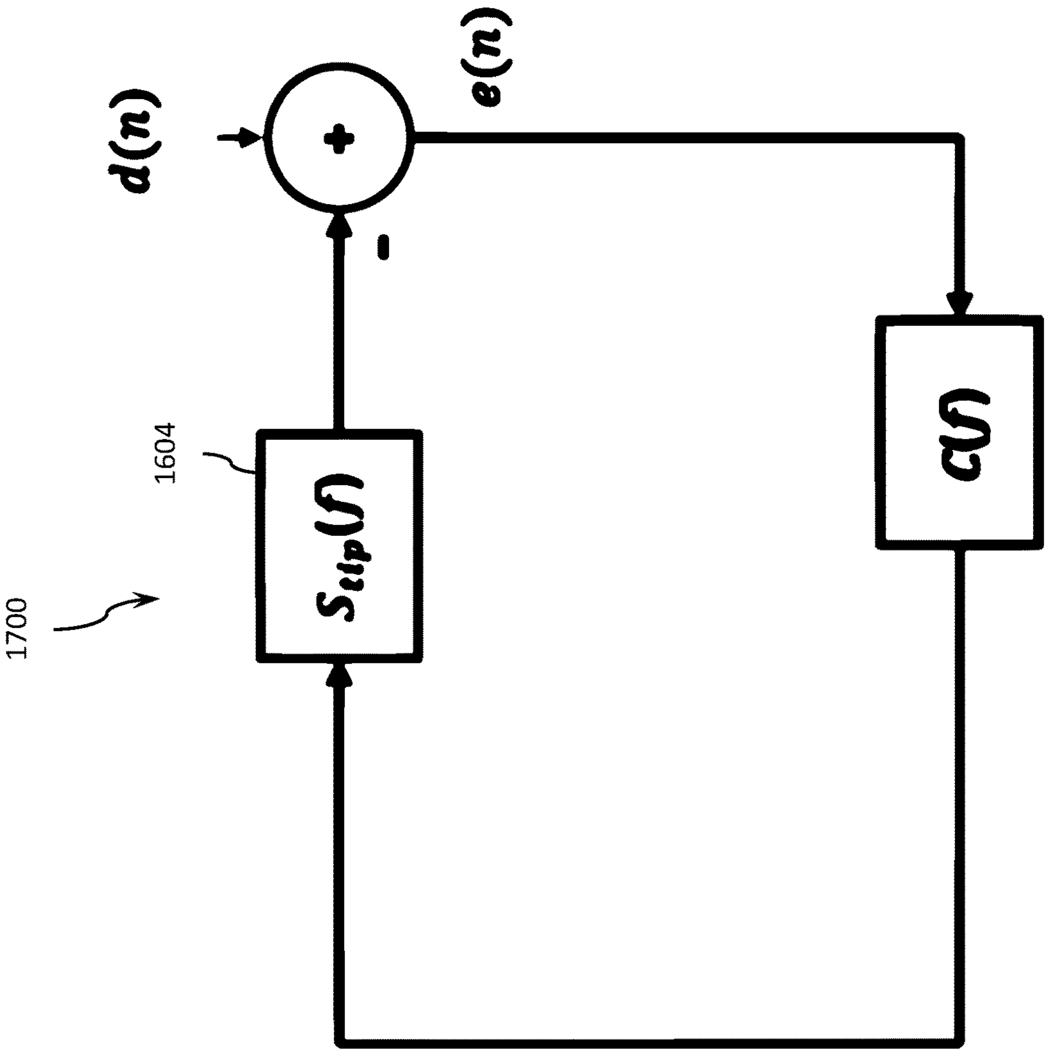
FIG. 17 is a block diagram of a virtual ANC signal processing technique, according to various embodiments of the present disclosure.
Figure 18:
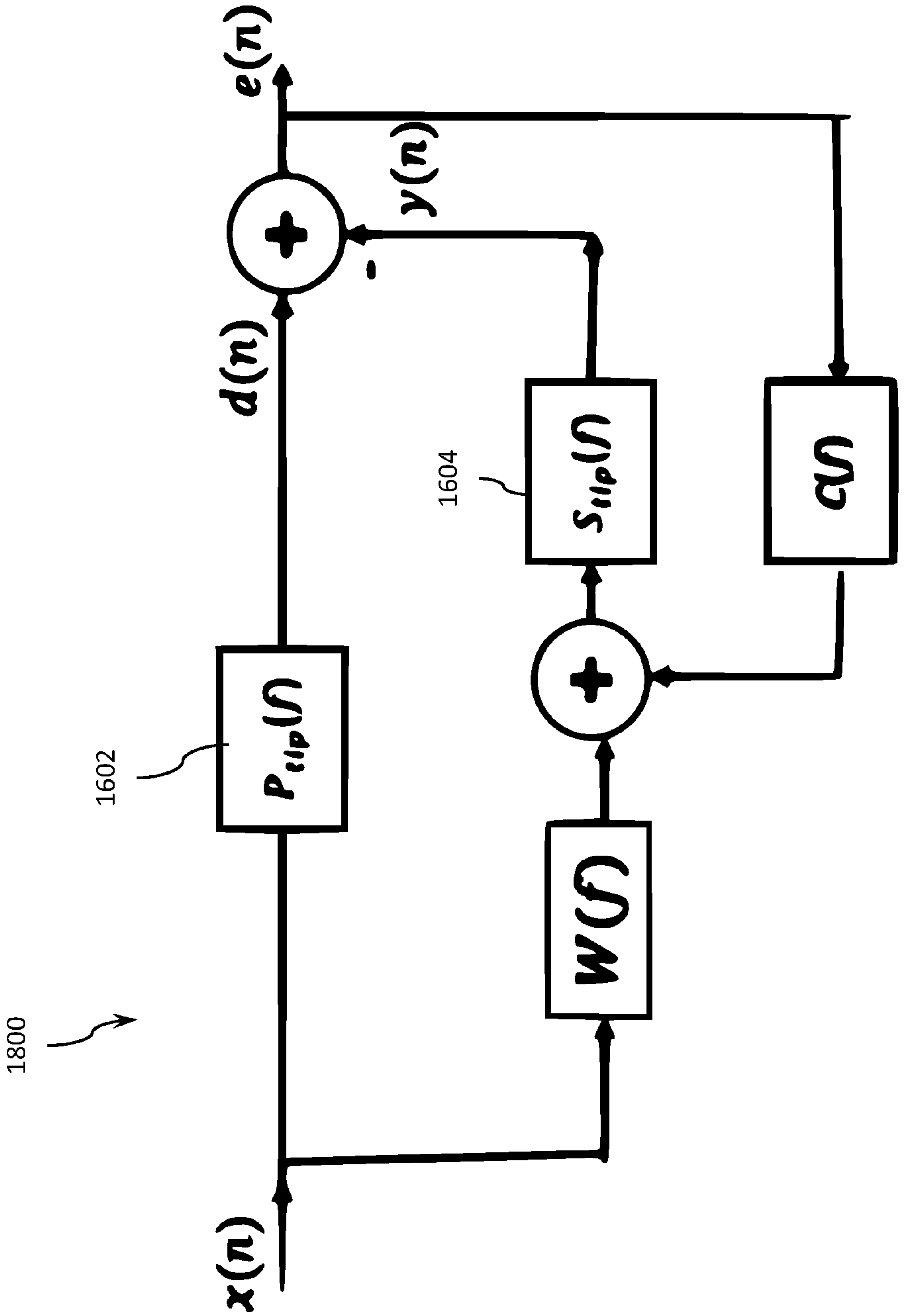
FIG. 18. is a block diagram of a virtual ANC signal processing technique, according to various embodiments of the present disclosure.

FIG. 15 illustrates an example earbud 1500 where a virtual internal microphone is estimated at a location closer to the ear tip while the actual internal microphone is physically located in the sound port. FIGS. 16-18 are block diagrams of a virtual ANC signal processing technique for a feedforward ANC, feedback ANC, and hybrid ANC system, according to embodiments of the present disclosure. As shown in FIG. 15, the actual internal microphone 1508 is physically disposed within in the sound port of the earbud, but the ANC circuitry processes the error signal to cancel the external noise at a location closer to and potentially inside of the user's ear canal. Thus, an error from the virtual internal microphone more closely represents what the user may detect.

In some embodiments, additional signal processing may be executed to map the path P(f) to the virtual path $P_{tip}(f)$ at the output of the earbud (e.g., at the ear tip 1506), and map the micro-speaker S(f) at the virtual microphone at tip location as shown in FIG. 15. $P_{tip}(f)$ may be defined as a virtual transfer function from the external microphone to the ear tip location, and $S_{tip}(f)$ defined as a virtual transfer function from the micro-speaker to the ear tip location. In some embodiments, $P_{tip}(f)$ may be derived from empirical data, and $S_{tip}(f)$ may be mapped from S(f) and additional transmission line from the internal microphone to the ear tip location. Consequently, P(f) and S(f) in FIGS. 4-6 may be replaced with $P_{tip}(f)$ (reference 1602) and $S_{tip}(f)$ (reference 1604), as shown in ANC processing blocks 1600, 1700 and 1800 of FIGS. 16-18, respectively. Accordingly, noise cancellation at the ear tip location may be improved, and in turn, also improves that noise cancellation that at the ear drum of the earbud user.

Embodiments described herein are example only. One skilled in the art may recognize various alternative embodiments from those specifically disclosed. Those alternative embodiments are also intended to be within the scope of this disclosure. As such, the embodiments are limited only by the following claims and their equivalents.

What is claimed:

1. A device comprising:
   - a speaker coupled to a first housing;
   - a sound port having a first end and a second end, wherein:
     - the first end is coupled to the first housing,
     - the second end is configured to be inserted in an ear canal of a person such that sound waves emitted from the speaker propagate via a secondary path to the ear canal through the sound port, and
     - the sound port comprises a straight channel;
   - active noise cancellation (ANC) components configured to generate an anti-noise signal through the speaker to cancel an external noise; and
   - a tube having a first end disposed at or adjacent to an external end of the sound port; and a first microphone coupled to the tube and configured to detect the anti-noise signal that propagates through the sound port via the secondary path and the external noise that propagates via a primary path.

2. The device as recited in claim 1, wherein the first end of the tube is configured to receive sound at the first end.

3. The device as recited in claim 2, wherein the tube is configured to propagate the received sound to the first microphone.

4. The device as recited in claim 1, wherein the tube is disposed at least partially within the sound port.

5. The device as recited in claim 1, wherein the first microphone is disposed at least partially within the sound port.

6. The device as recited in claim 1, wherein the first microphone is disposed within the device and is not disposed at least partially within the sound port.

7. The device as recited in claim 1, wherein the tube is attached to an ear tip of the device.

8. The device as recited in claim 1, wherein the tube extends beyond an ear tip of the device.

9. The device as recited in claim 1, further comprising a second housing coupled to the first housing, wherein the second housing comprises an acoustic chamber for a microspeaker back-cavity.

10. The device as recited in claim 9, wherein the second housing further comprises a second microphone configured to detect the external noise.

11. The device as recited in claim 9, further comprising a third housing coupled to the second housing, wherein the third housing comprises a second microphone configured to detect the external noise.

12. The device as recited in claim 1, wherein the ANC components comprise analog ANC filters.

13. The device as recited in claim 1, wherein the ANC components comprise digital ANC filters.

14. The device as recited in claim 1, wherein the ANC components comprise feedforward ANC components.

15. The device as recited in claim 1, wherein the ANC components comprise feedback ANC components.

16. The device as recited in claim 1, wherein the ANC components comprise hybrid ANC components.

17. The device as recited in claim 1, wherein the ANC components are further configured to define a virtual error microphone location and generate the anti-noise signal to cancel the external noise at the virtual error microphone location.

18. A method comprising:

coupling a speaker to a first housing;

attaching a sound port to the first housing, the sound port having a first end and a second end, wherein the first end is coupled to the first housing, and the second end is configured to be inserted in an ear canal of a person such that sound waves emitted from the speaker propagate via a secondary path to the ear canal through the sound port, and wherein the sound port comprises a straight channel;

generating an anti-noise signal through the speaker to cancel external noise; and detecting, using an error microphone coupled to a tube having a first end disposed at or adjacent to an external end of the sound port, the anti-noise signal that propagates through the sound port via the secondary path and the external noise that propagates via a primary path.

19. The method as recited in claim 18, wherein the first end of the tube is configured to receive sound at the first end.

20. The method as recited in claim 19, wherein the tube is configured to propagate the received sound to the error microphone.

* * * * *